US010940525B2

(12) United States Patent
Inagaki et al.

(10) Patent No.: US 10,940,525 B2
(45) Date of Patent: Mar. 9, 2021

(54) RIVETING MACHINE AND CONTROL METHOD FOR SAME

(71) Applicant: MITSUBISHI HEAVY INDUSTRIES, LTD., Tokyo (JP)

(72) Inventors: Takahiro Inagaki, Tokyo (JP); Hiroyuki Saito, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 203 days.

(21) Appl. No.: 16/097,637

(22) PCT Filed: May 19, 2017

(86) PCT No.: PCT/JP2017/018936
§ 371 (c)(1),
(2) Date: Oct. 30, 2018

(87) PCT Pub. No.: WO2017/200104
PCT Pub. Date: Nov. 23, 2017

(65) Prior Publication Data
US 2019/0134699 A1     May 9, 2019

(30) Foreign Application Priority Data
May 20, 2016    (JP) .............................. JP2016-101942

(51) Int. Cl.
*B21J 15/28*      (2006.01)
*B21J 15/36*      (2006.01)
(Continued)

(52) U.S. Cl.
CPC .............. *B21J 15/28* (2013.01); *B21J 15/02* (2013.01); *B21J 15/10* (2013.01); *B21J 15/30* (2013.01);
(Continued)

(58) Field of Classification Search
CPC ... B21J 15/28; B21J 15/30; B21J 15/10; B21J 15/02; B21J 15/48; B21J 15/36;
(Continued)

(56) References Cited

U.S. PATENT DOCUMENTS 4,901,431 A * 2/1990 Gast .......................... B21J 15/32
                                                    29/707
4,955,119 A * 9/1990 Bonomi ................... B21J 15/10
                                                    227/58
(Continued)

FOREIGN PATENT DOCUMENTS

JP        02244517 A      9/1990
JP     H03285736 A     12/1991
(Continued)

OTHER PUBLICATIONS

Office Action for Japanese Application No. 2016-101942 dated Feb. 4, 2020; 12pp.
(Continued)

*Primary Examiner* — Lawrence Averick
(74) *Attorney, Agent, or Firm* — Kanesaka Berner and Partners LLP

(57) ABSTRACT

An automatic riveting device is provided with a rivet suction attachment unit for attaching the head of a rivet by suction, a tightening unit for tightening a stringer and clip by the rivet, and a control unit. The control unit controls the rivet suction attachment unit so that the rivet suction attachment unit to which the head of the rivet is attached is moved toward an upper side support body and the shaft part of the rivet is inserted into a through hole formed in riveting position P, and controls the tightening nit so that after the rivet suction attachment unit inserts the rivet into the through hole and retreats from the riveting position P, an
(Continued)

upper anvil and a lower anvil are brought into proximity and the stringer and clip are tightened by the rivet.

5 Claims, 19 Drawing Sheets

(51) Int. Cl.
    *B21J 15/42* (2006.01)
    *B21J 15/44* (2006.01)
    *B21J 15/32* (2006.01)
    *B23P 19/04* (2006.01)
    *B21J 15/30* (2006.01)
    *B21J 15/10* (2006.01)
    *B21J 15/02* (2006.01)
    *B21J 15/48* (2006.01)

(52) U.S. Cl.
    CPC ............... *B21J 15/32* (2013.01); *B21J 15/36* (2013.01); *B21J 15/42* (2013.01); *B21J 15/44* (2013.01); *B21J 15/48* (2013.01); *B23P 19/04* (2013.01)

(58) Field of Classification Search
    CPC .. B21J 15/42; B21J 15/44; B21J 15/32; B23P 19/04
    See application file for complete search history.

(56) References Cited

U.S. PATENT DOCUMENTS

| 4,995,148 A | | 2/1991 | Bonomi et al. |
|---|---|---|---|
| 5,213,454 A | * | 5/1993 | Givler ................... B21J 15/10 408/61 |
| 9,021,677 B1 | | 5/2015 | Burns et al. |
| 2002/0092145 A1 | | 7/2002 | Blocher et al. |
| 2005/0081360 A1 | | 4/2005 | Blocher et al. |
| 2014/0361565 A1 | | 12/2014 | Ikeda et al. |

FOREIGN PATENT DOCUMENTS

| JP | H04083549 U | 7/1992 |
|---|---|---|
| JP | 200038889 A | 2/2000 |
| JP | 2002263777 A | 9/2002 |
| JP | 2003010941 A | 1/2003 |
| JP | 2003231042 A | 8/2003 |
| JP | 4379656 B2 | 12/2009 |
| JP | 2013158791 A | 8/2013 |

OTHER PUBLICATIONS

International Search Report and Written Opinion for International Application No. PCT/JP2017/018936 dated Aug. 1, 2017; 16pp.

* cited by examiner

RIVETING MACHINE AND CONTROL METHOD FOR SAME

RELATED APPLICATIONS

The present application is a National Phase of International Application Number PCT/JP2017/018936 filed May 19, 2017 and claims priority to Japanese Application Number 2016-101942 filed May 20, 2016.

TECHNICAL FIELD

The present invention relates to a riveting machine and a control method for the same.

BACKGROUND ART

In the related art, automatic riveting machines that automatically rivet a rivet in an object to be fastened, such as a fuselage panel of an aircraft, to fasten the object to be fastened have been known (for example, refer to Patent Document 1).

In the riveting machine disclosed in Patent Document 1, in order to perform riveting processing at a riveting point that is present in a narrow space, such as a corner portion of a member or an intersecting portion between members, a shaft body having an end surface that suctions the rivet is adopted instead of a gripping member that is operated to open and close. According to Patent Document 1, a transfer or loading of a rivet to a caulking position is performed by suction. Therefore, it is possible to make the support body for housing the shaft body compact, and to locate the support body comfortably also at a riveting point that is present in the narrow space, such as a corner portion of a member or an intersecting portion between members.

CITATION LIST

Patent Literature

Patent Document 1: Japanese Patent No. 4379656

SUMMARY OF INVENTION

Technical Problem

However, in Patent Document 1, the shaft body used for the transfer or loading of the rivet is also used as a member for caulking the rivet. For that reason, the shape of an end surface of the shaft body in contact with the head part of the rivet needs to be formed in a shape suitable for positioning when the rivet is caulked while the head part of the rivet is capable of being suctioned.

For that reason, in Patent Document 1, it is necessary to cause the shape of the end surface of the shaft body to coincide with the shape of a specific rivet. In this case, in a case where riveting is performed using various types of rivets, it is necessary to perform riveting processing after various types of shaft bodies that coincide with the shapes of end surfaces of the various types of shaft bodies are prepared in advance, and substitution with a shaft body that coincides with the shape of a rivet to be used for riveting is made.

Hence, in Patent Document 1, although it is possible to perform riveting in the narrow space, the productivity when the riveting is performed using the various types of rivets cannot be improved.

The invention has been made in view of such circumstances, and an object thereof is to provide a riveting machine and a control method for the same that improve productivity when performing riveting by using various types of rivets while making riveting of rivets possible in a narrow space.

Solution to Problem

In order to solve the above subject, the invention adopts the following means.

That is, a riveting machine of an aspect of the invention is a riveting machine that rivets a rivet at a riveting position of a pair of members to be fastened relative positions of which are fixed. The riveting machine includes a first support body that is formed in a rod shape having a through hole extending along an axis and supports one member of the pair of members to be fastened at the riveting position; a second support body that is formed in a rod shape having a through hole extending along the axis and supports the other pair of the pair of members to be fastened at the riveting position; a rivet suction part that is formed in a cylindrical shape extending along the axis, and suctions a head part of the rivet with an interior thereof being in a negative-pressure state in a state where one end is brought into contact with the head part of the rivet; a caulking part that caulks the pair of members to be fastened by the rivet by inserting a pair of caulking members into the first support body and the second support body and bringing the pair of caulking members close to each other, in a state where the rivet is inserted into through holes formed in the pair of members to be fastened at the riveting position; and a control unit that controls the rivet suction part and the caulking part. The control unit controls the rivet suction part so as to move the rivet suction part, to which the head part of the rivet is suctioned, to the first support body to insert the shaft part of the rivet into the through holes formed at the riveting position, and controls the caulking part so as to bring the pair of caulking members close to each other to caulk the pair of members to be fastened by the rivet after the rivet suction part inserts the rivet into the through holes and retreats from the riveting position.

According to the riveting machine of the aspect of the invention, one member of the pair of the members to be fastened of which the relative positions are fixed is supported at the riveting position by the first support body, and the other member of the pair of the members to be fastened is supported at the riveting position by the second support body. The first support body is formed in a rod shape having a through hole extending along the axis, the rivet suctioned to the rivet suction part formed in a cylindrical shape is inserted, and one caulking member of the pair of caulking members is inserted.

In this way, according to the riveting machine of the aspect of the invention, since the first support body is formed in a rod shape having the through hole extending along the axis, the first support body can be appropriately moved to the riveting position even if the riveting position is in a narrow space.

According to the riveting machine of the aspect of the invention, in order to bring the pair of caulking members close to each other after the rivet is inserted into the through holes and the rivet suction part is retreated from the first support body, the insertion of the rivet and the caulking of the rivet can be performed as respectively independent operations. For that reason, the rivet suction part can be formed in a shape suitable for the suction of the rivet, and a caulking member can be formed in a shape suitable for caulking. For example, the rivet suction part having shapes capable of suctioning various types of rivets, respectively, can be adopted, and a caulking member having shapes capable of caulking the various types of rivets, respectively, can be adopted.

Hence, compared to the case where insertion of a rivet and caulking of the rivet are performed using a single member, it is possible to perform riveting using various types of rivets, and the productivity when the riveting is performed is improved.

In this way, according to the riveting machine of the aspect of the invention, it is possible to improve productivity when performing riveting by using various types of rivets while making riveting of rivets possible in a narrow space.

The riveting machine of the aspect of the invention may further include a drilling part that performs drilling of the through holes in the pair of members to be fastened at the riveting position. The control unit may control the drilling part so as to perform the drilling of the through holes in the pair of members to be fastened that is supported at the riveting position by the first support body and the second support body, and may control the rivet suction part so as to insert the shaft part of the rivet into the through holes formed at the riveting position after the drilling part performs the drilling of the through holes and retreats from the riveting position.

In this way, since it is not necessary to form the through holes in advance with another device with respect to the riveting position of the pair of members to be fastened, the productivity is improved.

In the above configuration, a discharge hole for discharging cutting chips of the pair of members to be fastened which is generated by the drilling performed by the drilling part may be formed in the first support body.

In this way, the cutting chips generated by the drilling performed by the drilling part can be suctioned from the discharge hole and discharged to the outside, and the through holes can be excellently finished.

In the above configuration, the drilling part may include a measuring instrument that measures an amount of displacement caused by a reaction force received from the members to be fastened when performing the drilling of the through hole, and the control unit may store the amount of displacement measured by the measuring instrument and the through holes for which the amount of displacement is obtained, in association with each other.

In this way, in a case where inspection or the like of a fastening state in the riveting position is performed, a point having a possibility that the quality of the through holes is low can be specified.

A control method for a riveting machine of another aspect of the invention is a control method for a riveting machine that rivets a rivet at a riveting position of a pair of members to be fastened relative positions of which are fixed. The riveting machine includes a first support body that is formed in a rod shape having a through hole extending along an axis and supports one member of the pair of members to be fastened at the riveting position, a second support body that is formed in a rod shape having a through hole extending along the axis and supports the other member of the pair of members to be fastened at the riveting position, a rivet suction part that is formed in a cylindrical shape extending along the axis, and suctions a head part of the rivet with an interior thereof being in a negative-pressure state in a state where one end is brought into contact with the head part of the rivet, and a caulking part that caulks the pair of members to be fastened by the rivet by inserting a pair of caulking members into the first support body and the second support body and bringing the pair of caulking members close to each other, in a state where the rivet is inserted into through holes formed in the pair of members to be fastened at the riveting position. The method includes a first control step of controlling the rivet suction part so as to move the rivet suction part, to which the head part of the rivet is suctioned, to the first support body to insert the shaft part of the rivet into the through holes formed at the riveting position; and a second control step of controlling the caulking part so as to bring the pair of caulking members close to each other to caulk the pair of members to be fastened by the rivet after the rivet suction part inserts the rivet into the through holes and retreats from the riveting position.

According to the control method for a riveting machine of the other aspect of the invention, in order to bring the pair of caulking members close to each other after the rivet is inserted into the through holes and the rivet suction part is retreated from the first support body, the insertion of the rivet and the caulking of the rivet can be performed as respectively independent operations. For that reason, the rivet suction part can be formed in a shape suitable for the suction of the rivet, and the caulking members can be formed in a shape suitable for caulking. For example, the rivet suction part having shapes capable of suctioning various types of rivets, respectively, can be adopted, and a caulking member having shapes capable of caulking the various types of rivets, respectively, can be adopted.

Hence, compared to the case where insertion of a rivet and caulking of the rivet are performed using a single member, it is possible to perform riveting using various types of rivets, and the productivity when the riveting is performed is improved.

Advantageous Effects of Invention

According to the invention, it is possible to provide the riveting machine and the control method for the same that improve the productivity when performing riveting by using various types of rivets while making riveting of rivets possible in a narrow space.

DESCRIPTION OF EMBODIMENTS

Hereinafter, an automatic riveting machine 100 of an embodiment of the invention will be described with reference to the drawings.

Figure 2:
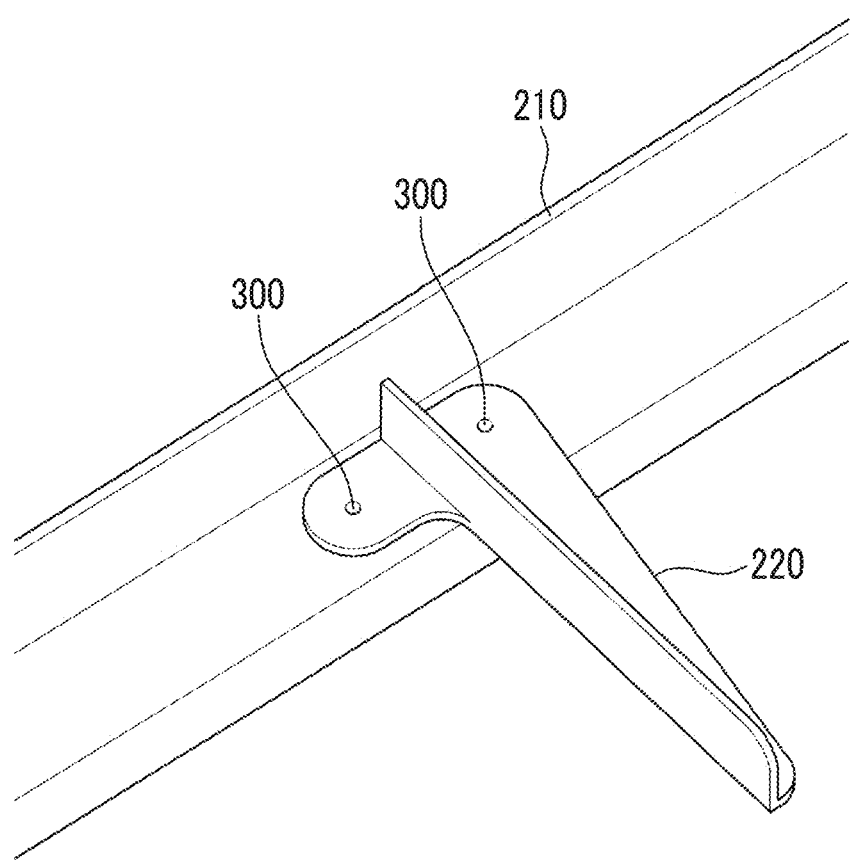
FIG. 2 is a perspective view illustrating a stringer and a clip.

The automatic riveting machine 100 of the present embodiment is a machine that rivets a rivet 300 to a riveting position P (refer to FIG. 5 and the like) of each of a pair of members to be fastened including a stringer 210 (longitudinal penetrating member) and a clip 220 that are illustrated in FIG. 2.

The stringer 210 is an elongated member that is disposed at intervals in an axis direction of an aircraft. The clip 220 is a member for fastening the stringer 210 to a frame (not illustrated) that holds a body of the aircraft split into panels in a cylindrical shape. The stringer 210 and the clip 220 are formed of, for example, an aluminum alloy.

As illustrated in FIG. 2, the stringer 210 and the clip 220 are fastened to each other by, for example the rivet 300 formed of an aluminum alloy. Although only a single clip 220 is illustrated in FIG. 2, a plurality of the clips 220 are fastened to the stringer 210 at a plurality of points in a length direction thereof by the automatic riveting machine 100.

Relative positions of the stringer 210 and the clip 220 are fixed by a gripping device (not illustrated), such as a robot hand, a fixture for temporary stop, or the like until the stringer 210 and the clip 220 are fastened to each other by the automatic riveting machine 100.

Figure 1:
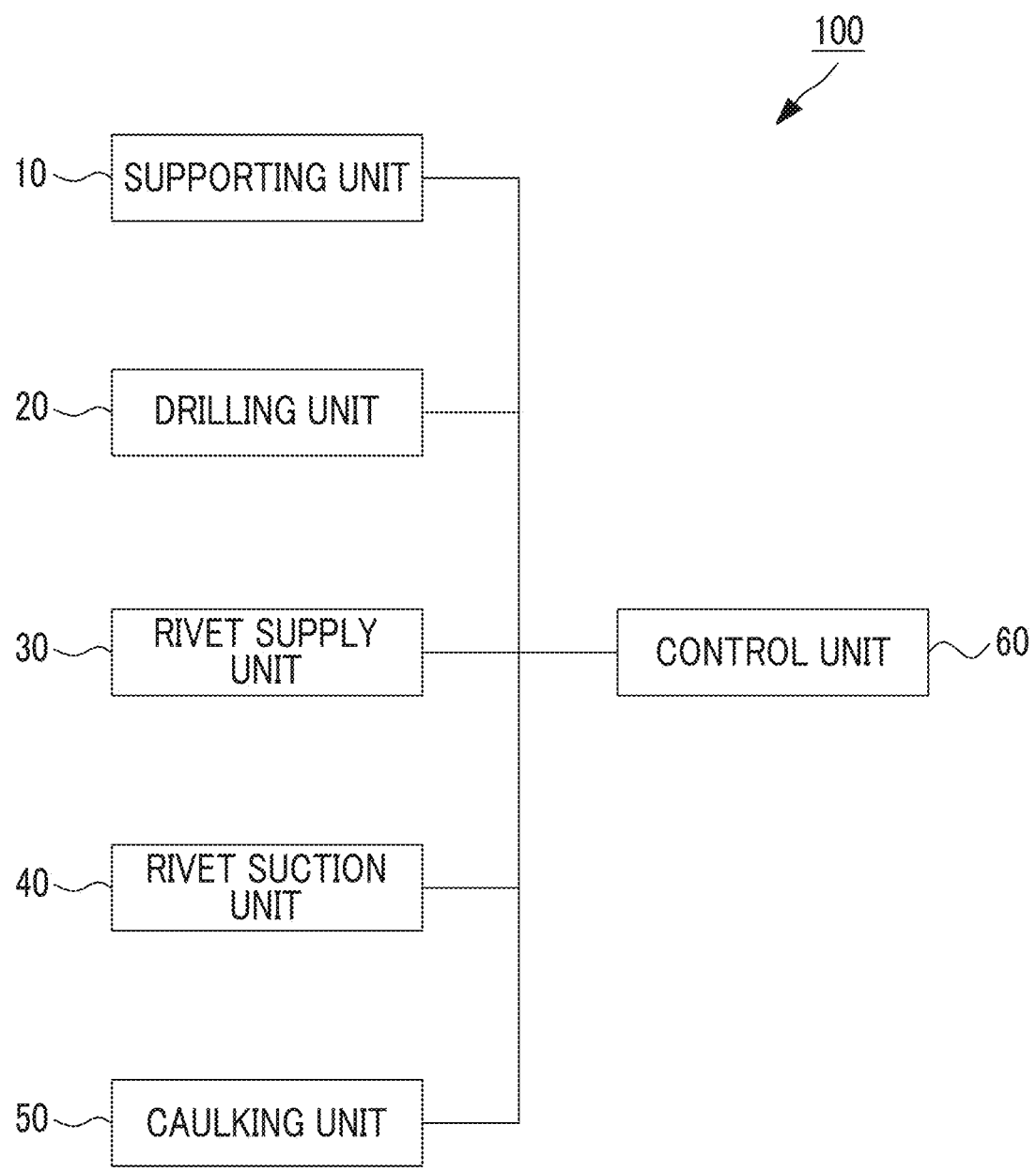
FIG. 1 is a configuration view illustrating a schematic configuration of an automatic riveting machine of an embodiment of the invention.

As illustrated in the schematic configuration of FIG. 1, the automatic riveting machine 100 includes a supporting unit 10, a drilling unit 20, a rivet supply unit 30, a rivet suction unit 40, a caulking unit 50, and a control unit 60. As illustrated in FIG. 1, the control unit 60 and the other respective parts are electrically connected to each other so as to be capable of communicating with each other via signal lines.

Figure 3:
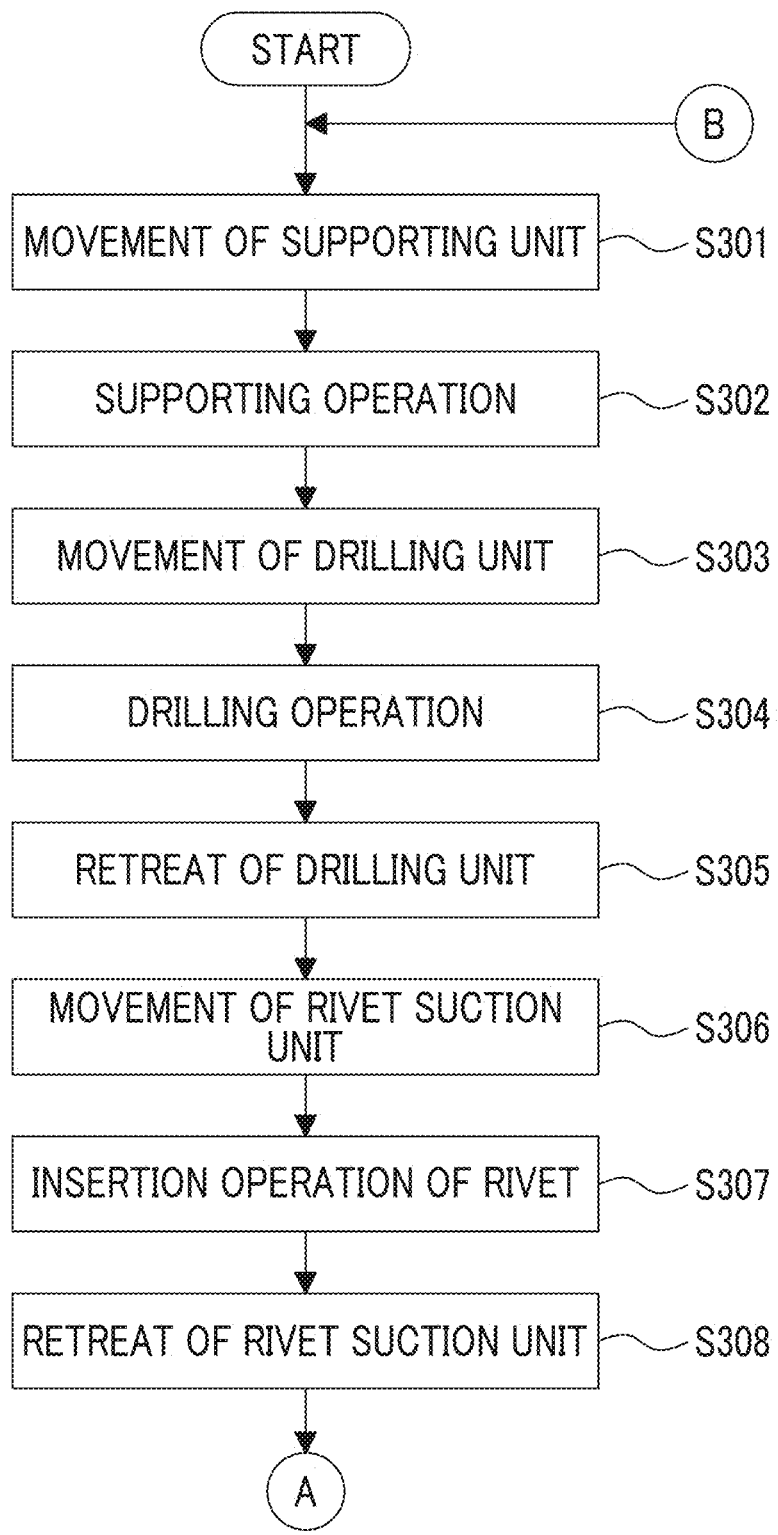
FIG. 3 is a flowchart illustrating the processing to be executed by a control unit illustrated in FIG. 1.
Figure 4:
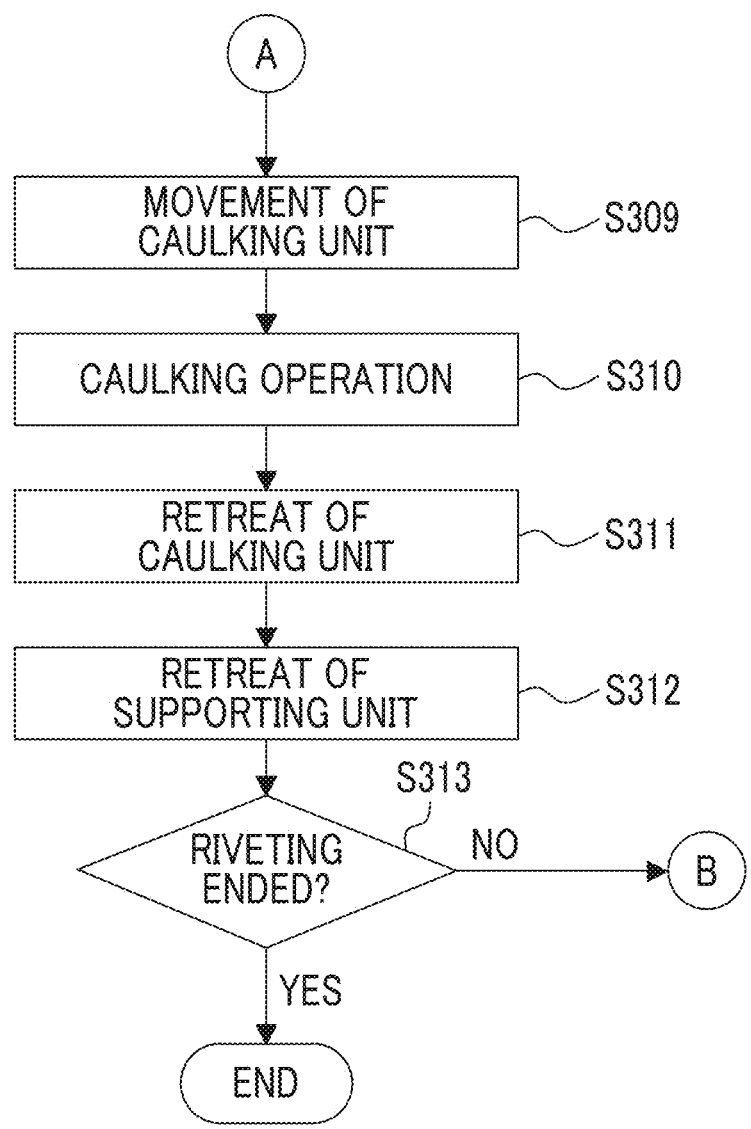
FIG. 4 is a flowchart illustrating the processing to be executed by the control unit illustrated in FIG. 1.
Figure 5:
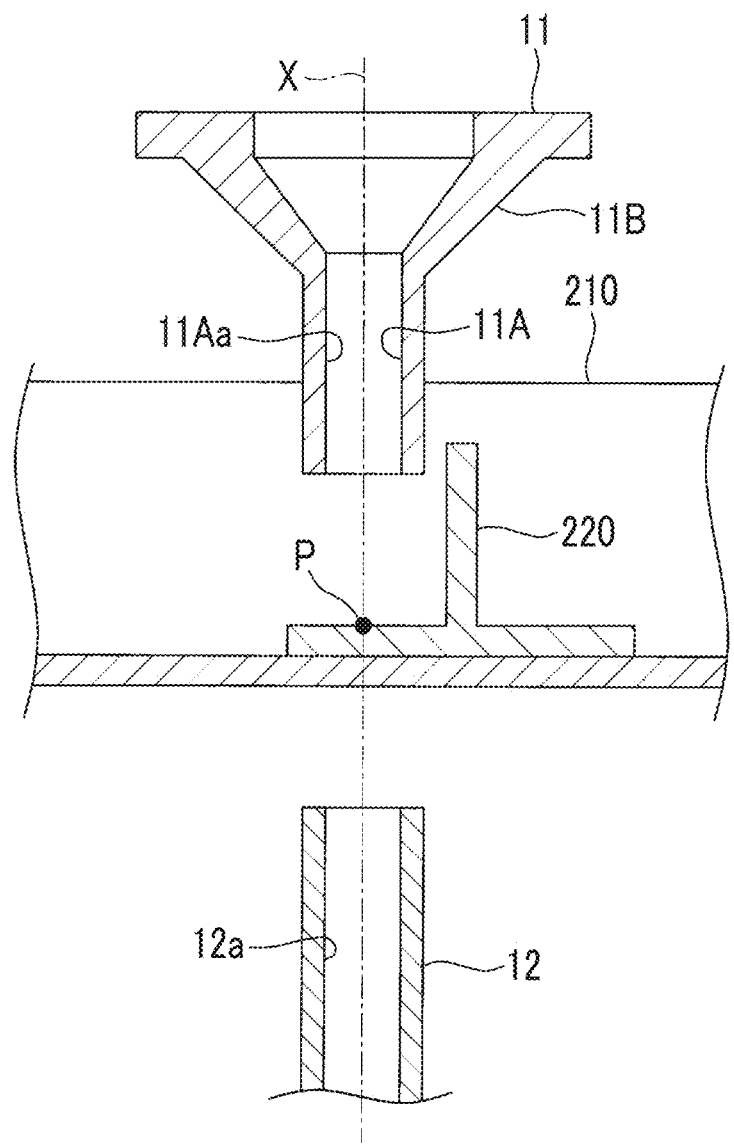
FIG. 5 is a longitudinal sectional view illustrating a state where a supporting unit has retreated from the stringer and the clip.
Figure 6:
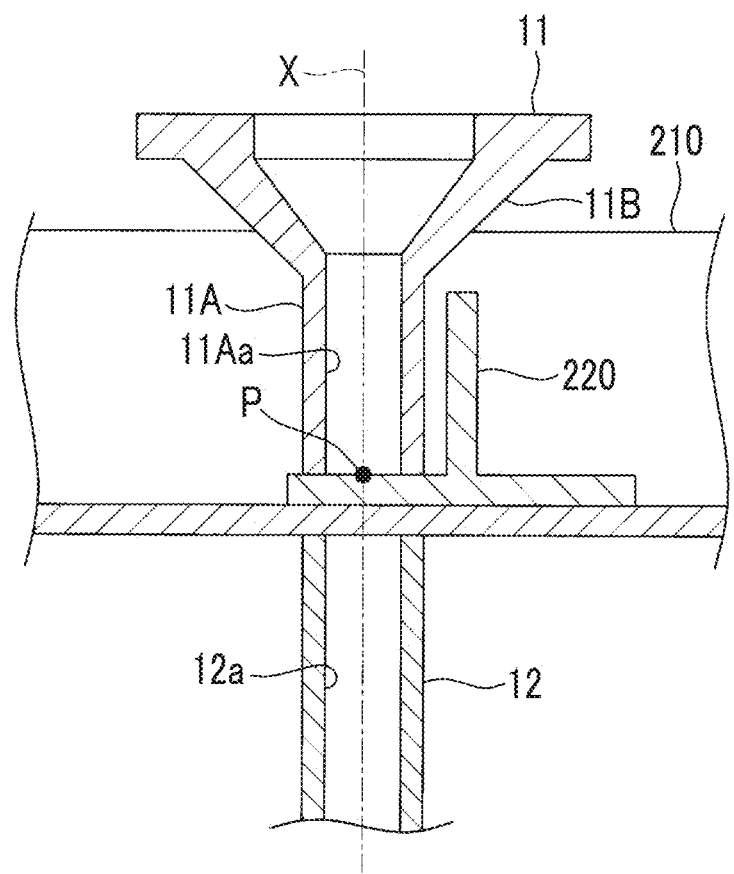
FIG. 6 is a longitudinal sectional view illustrating a state where the stringer and the clip are supported by the supporting unit.
Figure 7:
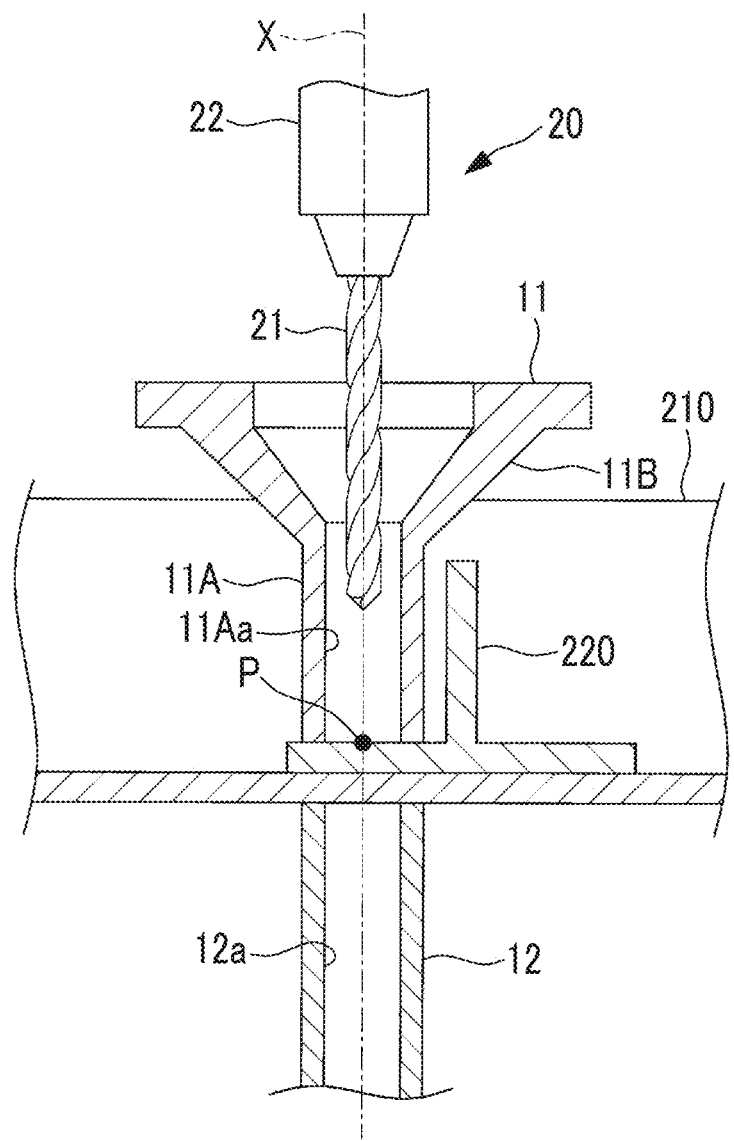
FIG. 7 is a longitudinal sectional view illustrating the stringer and the clip before a drilling operation by a drilling unit.
Figure 8:
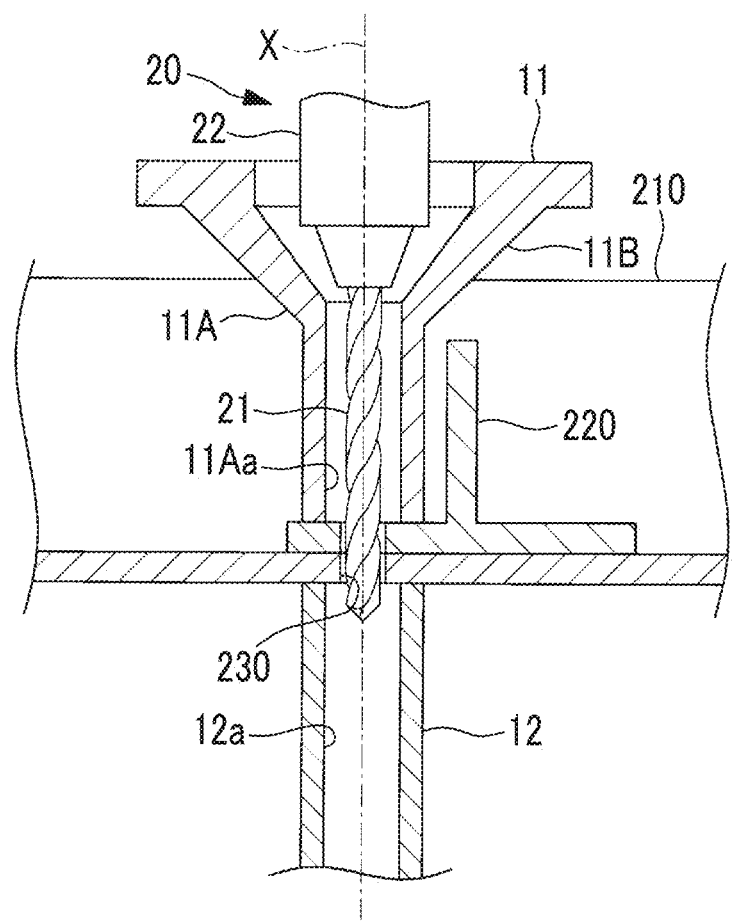
FIG. 8 is a longitudinal sectional view illustrating the stringer and the clip during the drilling operation by the drilling unit.
Figure 9:
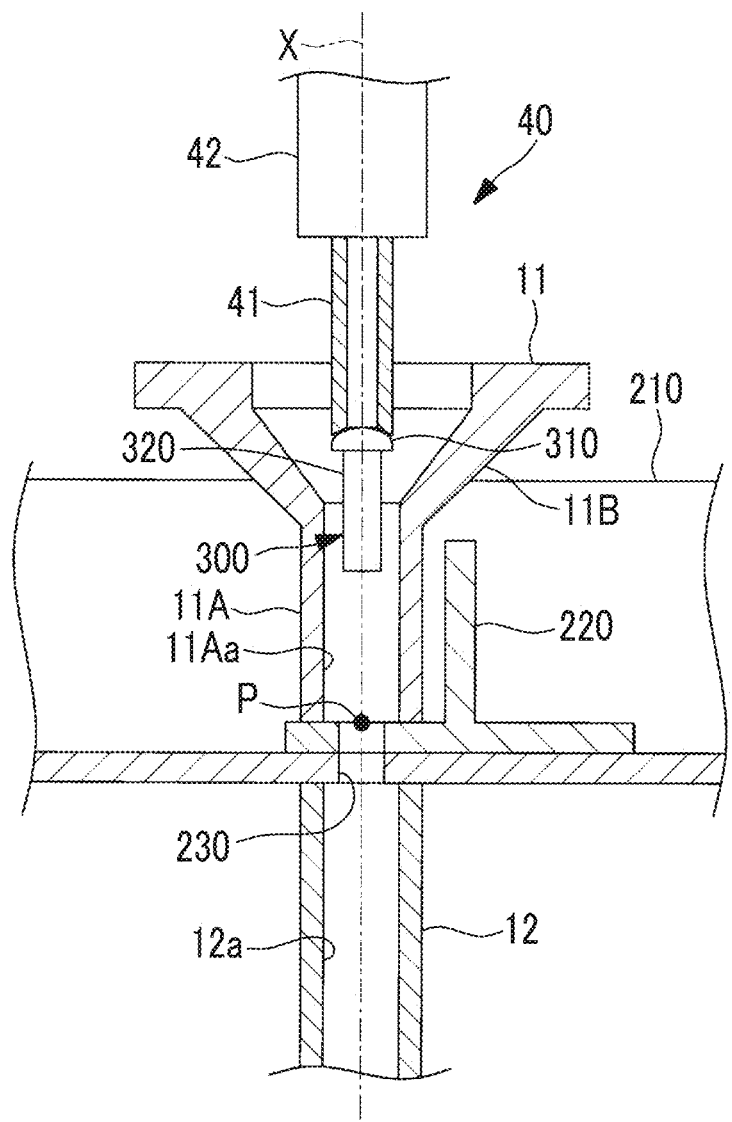
FIG. 9 is a longitudinal sectional view illustrating the stringer and the clip before insertion of rivet by a rivet suction unit.
Figure 10:
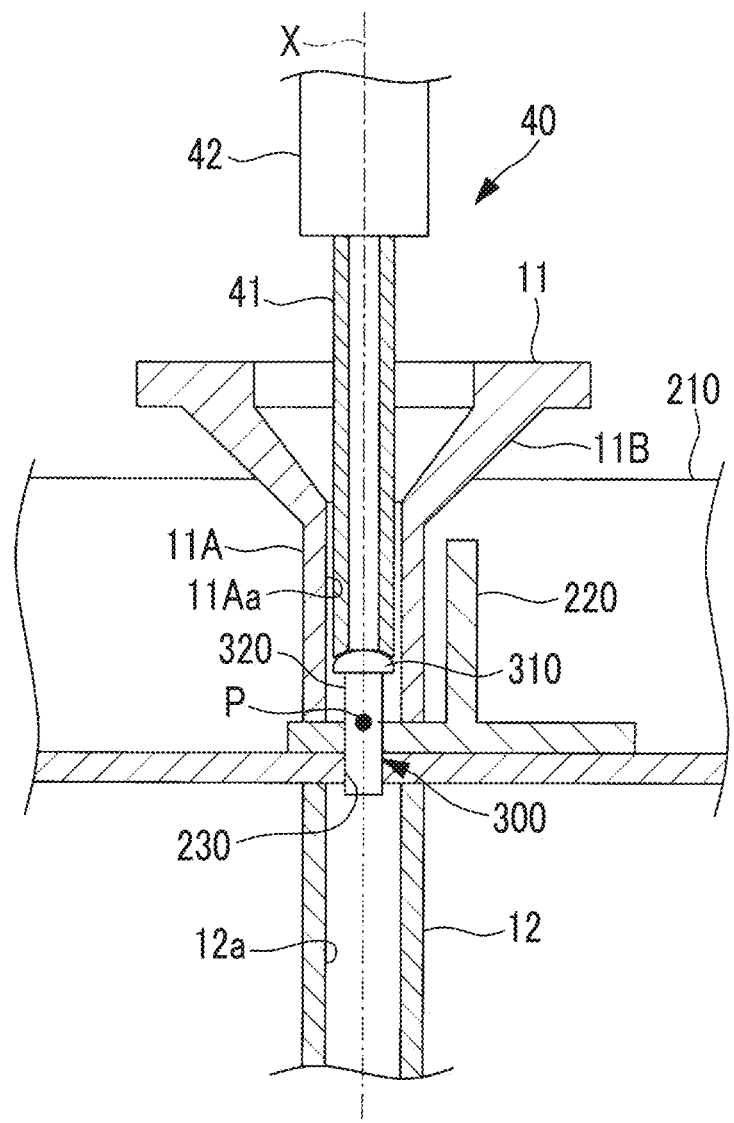
FIG. 10 is a longitudinal sectional view illustrating the stringer and the clip during the insertion of the rivet by the rivet suction unit.

In the present embodiment, FIGS. 3 and 4 are flowcharts illustrating the processing to be executed by the control unit 60. FIGS. 5 and 6 are longitudinal sectional views illustrating the operation of supporting the stringer 210 and the clip 220 by the supporting unit 10. FIGS. 7 and 8 are longitudinal sectional views illustrating the drilling operation of the stringer 210 and the clip 220 by the drilling unit 20. FIGS. 9 and 10 are longitudinal sectional views illustrating the insertion operation of the rivet 300 by the rivet suction unit 40. FIGS. 11 to 14 are longitudinal sectional views illustrating the caulking operation of the rivet 300 by the caulking unit 50.

Hereinafter, the respective parts included in the automatic riveting machine 100 will be described.

The supporting unit 10 is a device that supports the stringer 210 and the clip 220 so as to sandwich the stringer 210 and the clip 220 at the riveting position P (refer to FIG. 5 and the like).

The supporting unit 10 has a moving mechanism (not illustrated) capable of moving to a position coaxial with an axis X in a vertical direction that passes through the riveting position P, and retreating onto an axis different from the axis X. As illustrated in FIGS. 5 and 6, the supporting unit 10 has an upper support body (first support body) 11 and a lower support body (second support body) 12 that are coaxially disposed on the axis X.

As illustrated in FIG. 5, the upper support body 11 includes a rod-shaped part 11A that has a through hole 11Aa extending along the axis X and is formed in a rod shape, and a diameter-reduced part 11B that is coupled to the rod-shaped part 11A and is reduced in an external diameter and an internal diameter as approaching a coupling position with the rod-shaped part 11A, and is a member that supports an upper surface of the clip 220 at the riveting position P.

The reason that the diameter-reduced part 11B has a shape that is reduced in the external diameter and the internal diameter as the diameter-reduced part 11B approaches the coupling position is to prevent any interference with a bearing part of the drilling unit 20 or the caulking unit 50.

The lower support body 12 is formed in a rod shape having a through hole 12a extending along the axis X, and is a member that supports a lower surface of the stringer 210 at the riveting position P.

The drilling unit 20 is a device that performs drilling of through holes 230 in the stringer 210 and the clip 220 at the riveting position P.

As illustrated in FIGS. 7 and 8, the drilling unit 20 has a drill 21 that has blades formed at the tip and an outer peripheral surface thereof, and a body part 22 in which a drive part (not illustrated) for rotating the drill 21 around the axis X and moving the drill 21 along the axis X is built. The drilling unit 20 has a moving mechanism (not illustrated) capable of moving to a position coaxial with the axis X in the vertical direction that passes through the riveting position P, and retreating onto an axis different from the axis X.

The rivet supply unit 30 is a device that supplies the rivet 300 that is suctioned by the rivet suction unit 40 and is inserted into the through holes 230 at the riveting position P. The rivet supply unit 30 selectively supplies a rivet 300 to be inserted to the riveting position P from various types of rivets 300 in accordance with an instruction from the control unit 60.

As illustrated in FIGS. 9 and 10, the rivet suction unit 40 is a device that is formed in a cylindrical shape extending along the axis X, and suctions a head part 310 with the interior thereof being in a negative-pressure state in a state where one end thereof is brought into contact with the head part 310 of the rivet 300. The rivet suction unit 40 conveys the rivet 300 in a state where the head part 310 is suctioned, and inserts a shaft part 320 of the rivet 300 into the through holes 230 at the riveting position P.

As illustrated in FIGS. 9 and 10, the rivet suction unit 40 includes a suction shaft 41 that is formed in a cylindrical shape extending along the axis X and opens on a tip side thereof, and a cylinder 42 to which a proximal end side of the suction shaft 41 is attached and in which a drive mechanism (not illustrated) for moving the suction shaft 41 forward and backward along the axis X is built. The rivet suction unit 40 has a moving mechanism (not illustrated) capable of moving to a position coaxial with the axis X in the vertical direction that passes through the riveting position P, and retreating onto an axis different from the axis X.

The caulking unit 50 is a device that inserts a shaft-like upper anvil (caulking member) 51 and a shaft-like lower anvil (caulking member) 52 into the upper support body 11 and the lower support body 12 in a state where the shaft part 320 of the rivet 300 is inserted into the through holes 230, and brings the upper and lower anvils 51 and 52 close to each other to caulk the stringer 210 and the clip 220. The caulking unit 50 has a moving mechanism (not illustrated) capable of moving to a position coaxial with an axis X in a vertical direction that passes through the riveting position P, and retreating onto an axis different from axis X.

The control unit 100 is a device that controls the supporting unit 10, the drilling unit 20, the rivet supply unit 30, the rivet suction unit 40, the caulking unit 50, and the control unit 60.

The control unit 60 is constituted of, for example, a central processing unit (CPU), a random access memory (RAM), a read only memory (ROM), a computer-readable storage medium, and the like. A series of processing for realizing various functions are stored in the storage medium or the like in the form of a program as an example, and the various functions are realized when the CPU reads this program to the RAM or the like to execute processing of information and calculation processing. A form in which this program is installed in advance in the ROM or other storage media, a form in which this program is provided after being stored in the computer-readable storage medium, a form in which this program is distributed through communication means in a wired or wireless manner, or the like may be applied. The computer-readable storage medium is a magnetic disk, a magnetic-optical disk, a CD-ROM, a DVD-ROM, a semiconductor memory, or the like.

Next, the processing to be executed by the control unit 60 of the present embodiment will be described with reference to FIGS. 3 and 4.

In Step S301, the control unit 60 controls the moving mechanism (not illustrated) such that the supporting unit 10 moves to the position coaxial with the axis X in the vertical direction that passes through the riveting position P, and retreating onto the axis different from the axis X. If the movement of the supporting unit 10 by Step S301 is completed, a state illustrated in FIG. 5 is brought about.

In Step S302, the control unit 60 moves the upper support body 11 and the lower support body 12 along the axis X so as to approach each other, and brings about a state where the upper support body 11 supports the upper surface of the clip 220 at the riveting position P and the lower support body 12 supports the lower surface of the stringer 210 at the riveting position P. If the supporting operation by Step S302 is completed, a state illustrated in FIG. 6 is brought about. The state where the supporting unit 10 supports the stringer 210 and the clip 220 at the riveting position P is held up to Step S312 to be described below.

In Step S303, the control unit 60 controls the moving mechanism (not illustrated) such that the drilling unit 20 moves to the position coaxial with the axis X in the vertical direction that passes through the riveting position P, and retreating onto the axis different from the axis X. If the movement of the drilling unit 20 by Step S303 is completed, a state illustrated in FIG. 7 is brought about.

In Step S304, the control unit 60 moves the drilling unit 20 downward along the axis X to strike the tip of the drill 21 against the riveting position P to execute the drilling operation. If the drilling operation by Step S303 is completed, a state illustrated in FIG. 8 is brought about, and the through holes 230 passing through the stringer 210 and the clip 220 is formed.

In Step S305, the control unit 60 moves the drilling unit 20 upward along axis X, and controls the moving mechanism (not illustrated) so as to further retreat to a retreat position on another axis different from the axis X in the vertical direction that passes through the riveting position P.

In Step S306, the control unit 60 controls the moving mechanism (not illustrated) such that the rivet suction unit 40 moves to the position coaxial with the axis X in the vertical direction that passes through the riveting position P, and retreating onto the axis different from the axis X. If the movement of the rivet suction unit 40 by Step S306 is completed, a state illustrated in FIG. 9 is brought about.

As illustrated in FIG. 9, the rivet suction unit 40 brings the head part 310 of the rivet 300 into contact with the tip of the cylindrical suction shaft 41 to bring the interior of the suction shaft 41 into a negative-pressure state, thereby suctioning the rivet 300.

In Step S307, the control unit 60 executes the insertion operation of causing the suction shaft 41 to project downward along the axis X from the cylinder 42 to insert the tip of the shaft part 320 of the rivet 300 into the through holes 230 in a state where the rivet 300 is suctioned. If the insertion operation of the rivet 300 by Step S307 is completed, a state illustrated in FIG. 10 is brought about.

In Step S308, the control unit 60 moves the rivet suction unit 40 upward along axis X, and controls the moving mechanism (not illustrated) so as to further retreat to a retreat position on another axis different from the axis X in the vertical direction that passes through the riveting position P.

Figure 11:
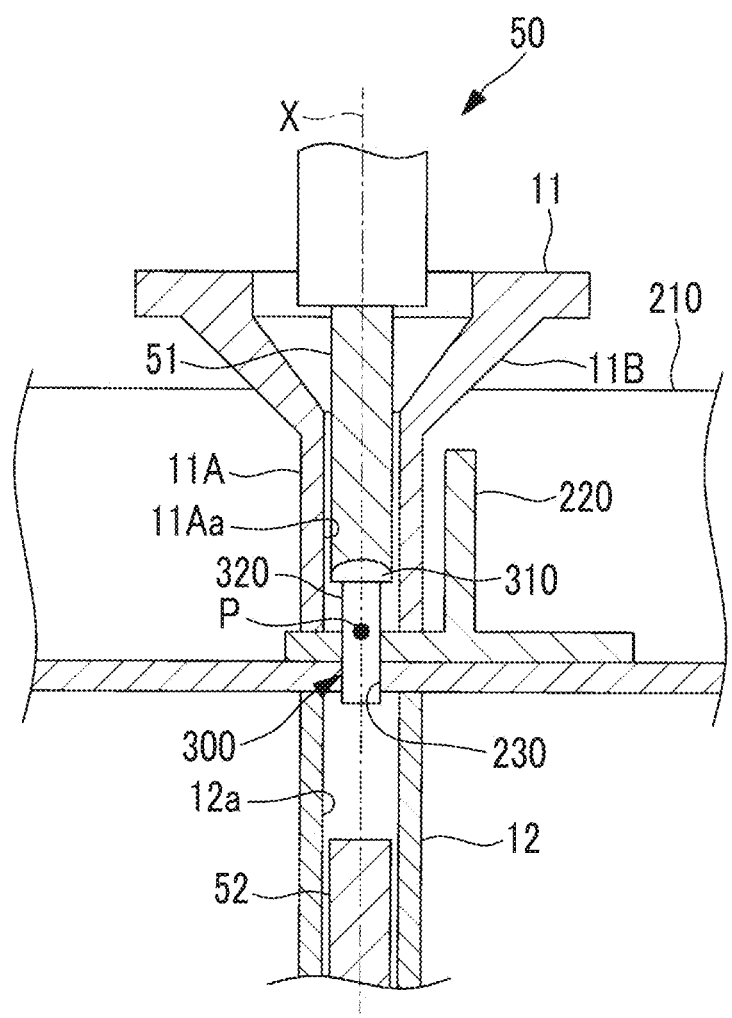
FIG. 11 is a longitudinal sectional view illustrating the stringer and the clip before a caulking operation by a caulking unit.

In Step S309, the control unit 60 controls the moving mechanism (not illustrated) such that the caulking unit 50 moves to the position coaxial with the axis X in the vertical direction that passes through the riveting position P, and retreating onto the axis different from the axis X. The upper anvil 51 of the caulking unit 50 is moved downward along the axis X, and brings about a state where a tip part of the upper anvil 51 is butted against the head part 310 of the rivet 300. If the movement of the caulking unit 50 by Step S309 is completed, a state illustrated in FIG. 11 is brought about.

In Step S310, the control unit 60 controls the caulking unit 50 so as to execute the caulking operation.

Figure 12:
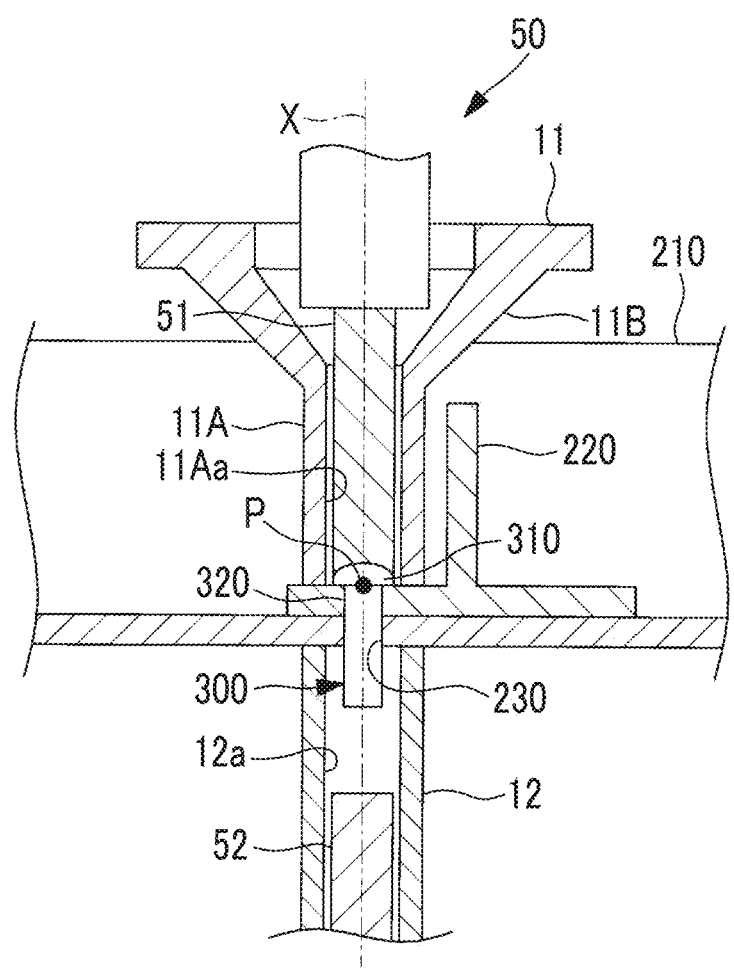
FIG. 12 is a longitudinal sectional view illustrating the stringer and the clip during a pushing operation of the rivet by the caulking unit.

As illustrated in FIG. 12, the control unit 60 further moves the upper anvil 51 of the caulking unit 50 downward along the axis X, and brings about a state where a lower surface of the head part 310 of the rivet 300 and the upper surface of the clip 220 are in contact with each other. The upper anvil 51 holds the position of the head part 310 of the rivet 300 on the axis X such that the lower surface of the head part 310 of the rivet 300 is not separated from the upper surface of the clip 220 at a caulking operation to be described below.

Figure 13:
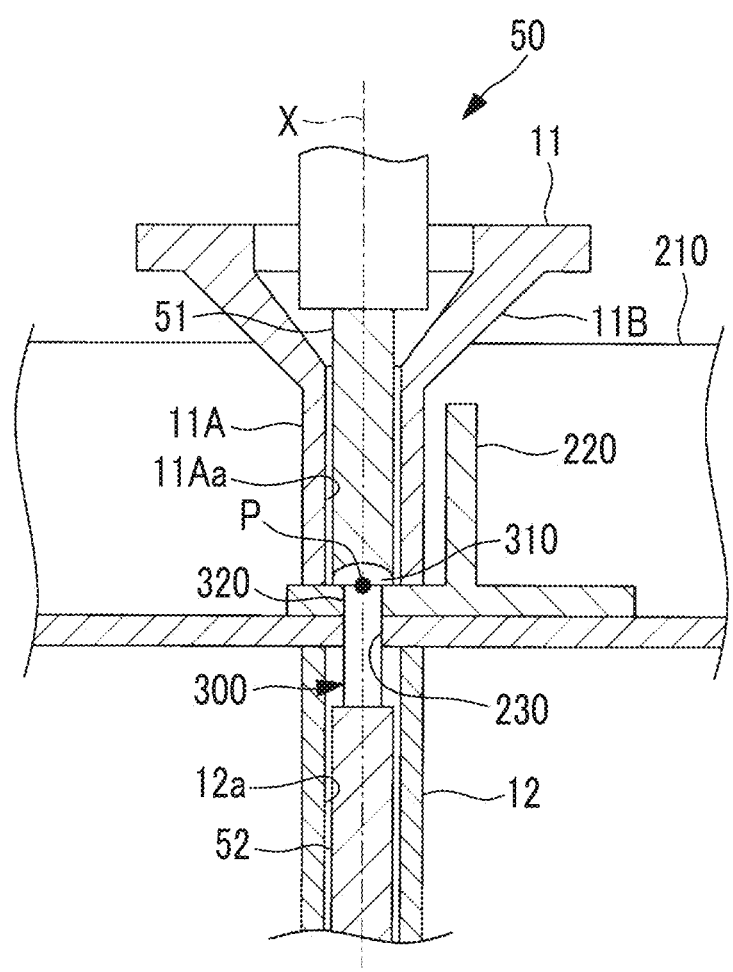
FIG. 13 is a longitudinal sectional view illustrating the stringer and the clip before the caulking operation by the caulking unit.

As illustrated in FIG. 13, the control unit 60 moves the lower anvil 52 of the caulking unit 50 upward along the axis X, and brings about a state where a tip part of the lower anvil 52 is butted against the tip of the shaft part 320 of the rivet 300.

Figure 14:
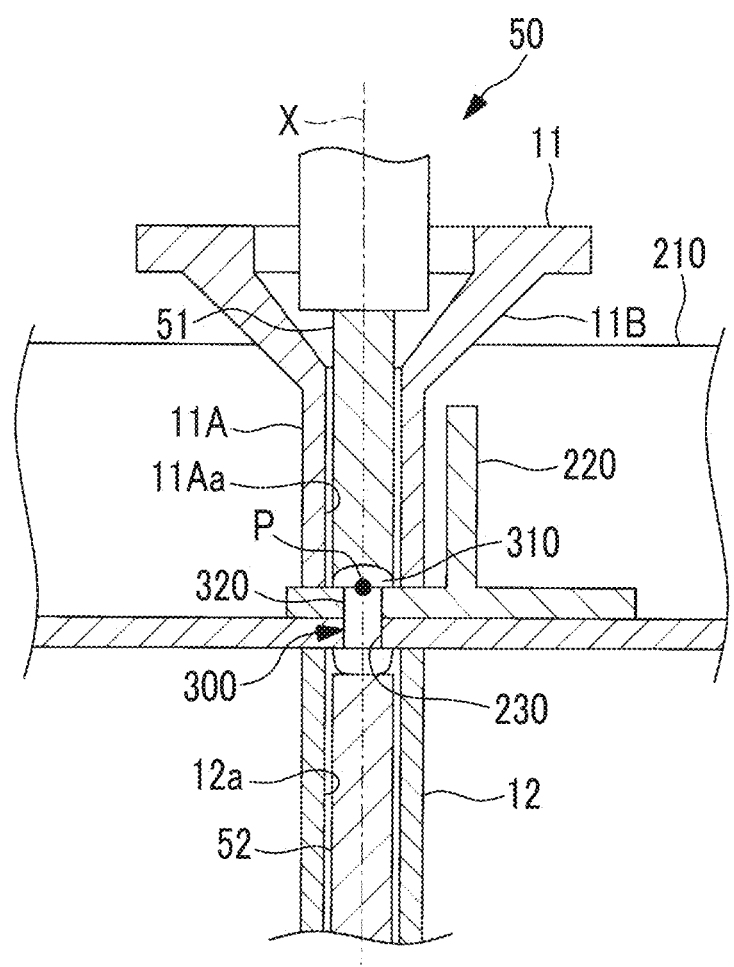
FIG. 14 is a longitudinal sectional view illustrating the stringer and the clip after the caulking operation by the caulking unit.

As illustrated in FIG. 14, the control unit 60 further moves the lower anvil 52 upward along the axis X, and plastically deforms the shaft part 320 of the rivet 300 made of a metal (for example, made of an aluminum alloy), to form the shaft part 320 in a shape larger than the internal diameter of the through holes 230.

In Step S311, the control unit 60 moves the upper anvil 51 upward along the axis X, moves the lower anvil 52 downward along the axis X, and controls the moving mechanism (not illustrated) so as to further retreat to a retreat position on another axis different from the axis X in the vertical direction that passes through the riveting position P.

In Step S312, since the caulking operation by the caulking unit 50 is completed and the stringer 210 and the clip 220 were fastened to each other by the rivet 300 at the riveting position P, in the control unit 60, releases the support by the supporting unit 10 to retreat the supporting unit 10. Specifically, the control unit 60 moves the upper support body 11 and the lower support body 12 along the axis X so as to be separated from each other. Moreover, the control unit 60 controls the moving mechanism (not illustrated) such that the supporting unit 10 retreats to a retreat position on another axis different from the axis X in the vertical direction that passes through the riveting position P.

In Step S313, since the fastening operation (drilling operation, insertion operation, and caulking operation) of one rivet 300 by Step S301 to Step S312 is completed, the control unit 60 determines whether or not the riveting of the rivet 300 is terminated.

In a case where the fastening operation of other rivets 300 is performed, the control unit 60 determines NO to repeat the processing of Step S301 to Step S312 again for the other rivets 300. On the other hand, in a case where the fastening operation of other rivets 300 are not performed, the control unit 60 determines YES to end the processing of this flowchart.

Here, the upper support body 11 of the present embodiment will be described in more detail.

Figure 15:
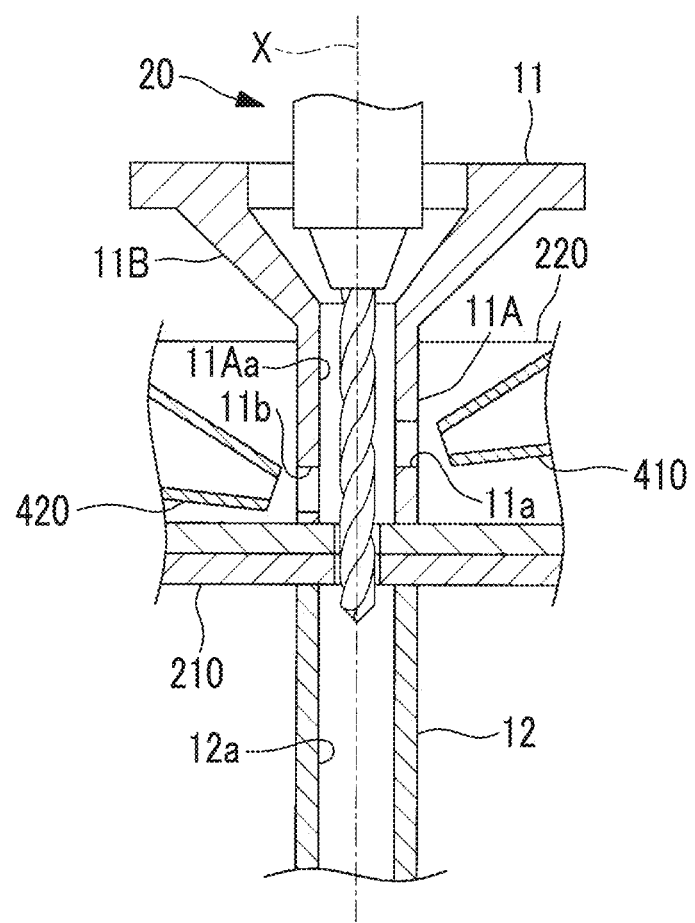
FIG. 15 is a longitudinal sectional view illustrating a modification example of an upper support body of the supporting unit.

As illustrated in FIG. 15, a discharge hole 11a and a discharge hole 11b for discharging cutting chips to the outside are provided in an outer peripheral surface on a lower end side of the upper support body 11.

When the drilling operation of the stringer 210 and the clip 220 is performed by the drilling unit 20, the upper support body 11 is capable of generating the cutting chips generated therein from the discharge hole 11a and the discharge hole 11b to the outside. In order to discharge the cutting chips to the outside, suction parts 410 and 420 are respectively brought close to outer peripheral surfaces of the discharge holes 11a and 11b, and the cutting chips are guided into the interiors of the suction parts 410 and 420 due to the action of the negative pressure generated inside the suction parts 410 and 420.

In the present embodiment, although an aspect in which the discharge hole 11a and the discharge hole 11b are provided in the upper support body 11 is adopted, it is also possible to adopt an aspect in which the discharge hole 11a and the discharge hole 11b are not provided in the upper support body 11. For example, in order to remove the generated cutting chips, a gap may be provided between the drill and through hole 11Aa to discharge the cutting chips from the diameter-reduced part 11B of the upper support body 11.

Here, a detecting device 70 included in the automatic riveting machine 100 of the present embodiment will be described. The detecting device 70 is a device that detects a normal direction at the riveting position P. The detecting device 70 is a device that detects the axis direction of each unit (the drilling unit 20 in the example illustrated in FIG. 16) of the automatic riveting machine 100 with respect to the upper surface of the clip 220 at the riveting position P. In an example illustrated in FIG. 16, in a case where the drilling unit 20 is at a position indicated by a dashed line in the figure, the detecting device 70 detects the angle of an axis X1 of the drilling unit 20 with respect to the upper surface of the clip 220 as an angle θ1. The angle θ1 illustrated in FIG. 16 does not coincide with an angle θ2 (90 degrees) that is the angle of a normal line (axis X2) of the upper surface of the clip 220.

Thus, the control unit 60 controls the moving mechanism of the drilling unit 20 on the basis of the angle θ1 detected by the detecting device 70 such that the axis X1 of the drilling unit 20 coincides with the normal line (axis X2) of the upper surface of the clip 220. Accordingly, the drilling unit 20 moves to a indicated by a solid line in FIG. 16, and the axis X1 of the drilling unit 20 coincides with the axis X2 that is the normal line. In this way, it is possible to perform the drilling operation by the drilling unit 20 from the normal direction of the upper surface of the clip 220, and form through holes in the normal direction.

Figure 16:
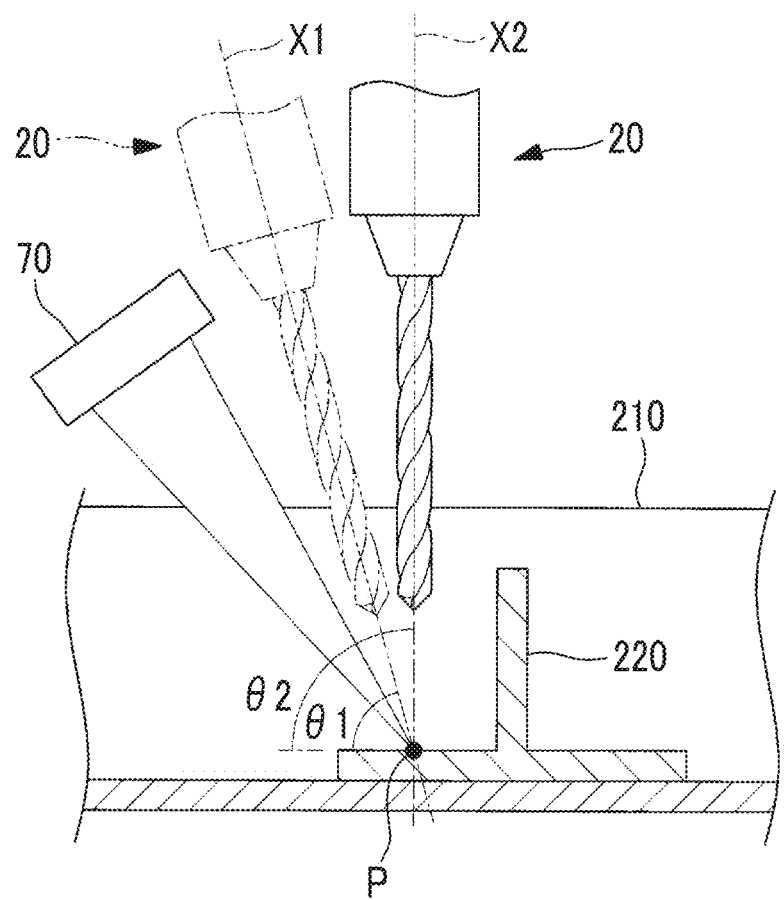
FIG. 16 is a longitudinal sectional view illustrating a detecting device that detects a normal direction of a riveting position of the stringer and the clip.

In the example illustrated in FIG. 16, the drilling unit 20 is moved to the position in the normal direction. However, the supporting unit 10, the rivet suction unit 40, and the caulking unit 50 may be moved at positions in the normal direction on the basis of an angle detected by the detecting device 70.

The position where the rivet suction unit 40 of the present embodiment separates the rivet 300 will be described in detail.

In a case where a distance L from the cylinder 42 to the tip of the suction shaft 41 is constant, the rivet suction unit 40 of the present embodiment separates the shaft part 320 after the shaft part 320 of the rivet 300 is inserted into the through holes 230. The rivet suction unit 40 has a single seated sensor (not illustrated) that detects that the distance L from the cylinder 42 to the tip of the suction shaft 41 is constant.

The rivet suction unit 40 having the single seated sensor can detect only that the distance L from the cylinder 42 to the tip of the suction shaft 41 is constant. In this case, the position or the like of the tip of the shaft part of the rivet with respect to the through holes 230 varies depending on the types of rivets to be suctioned by the rivet suction unit 40. For example, the rivet 300 indicated by a solid line in FIG. 17 and a rivet 300A indicated by a dashed line have different shapes. For that reason, a lower end of a shaft part 320A of the rivet 300A is disposed below a lower end of the shaft part 320 of the rivet 300. Similarly, a lower end of a head part 310A of the rivet 300A is disposed below a lower end of the head part 310 of the rivet 300.

Figure 17:
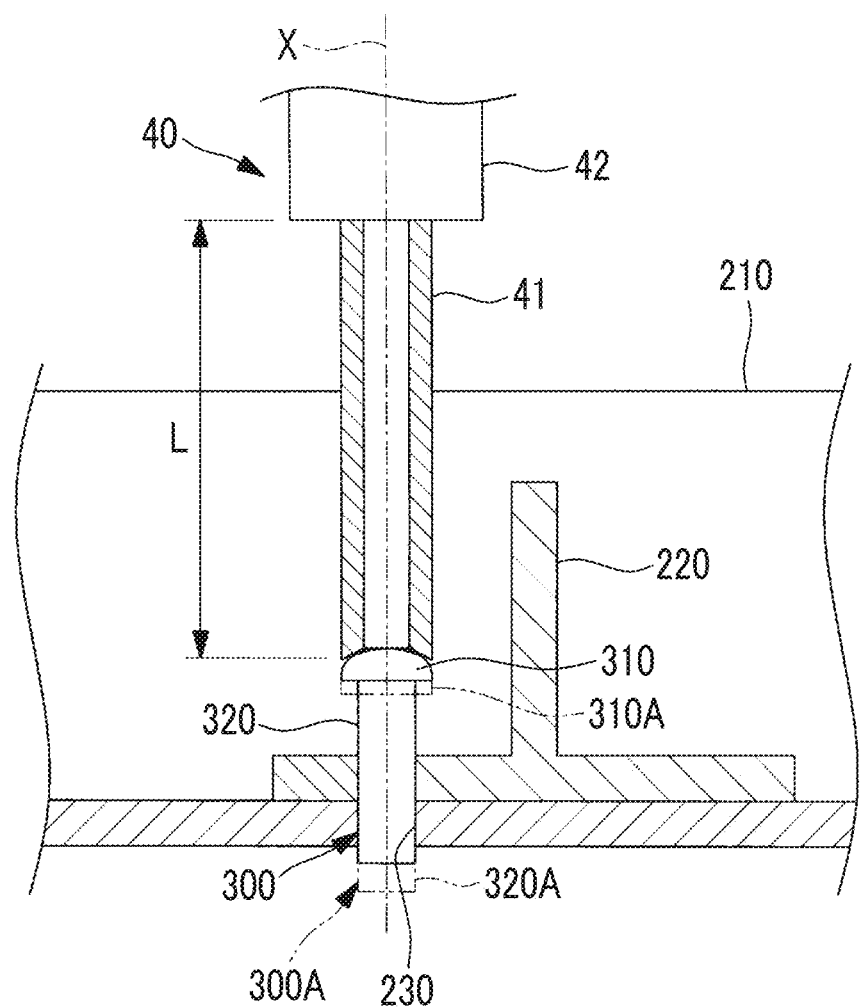
FIG. 17 is a longitudinal sectional view illustrating a position where the rivet suction unit separates the rivet.

For example, as in the rivet 300 and the rivet 300A illustrated in FIG. 17, in a case where various types of rivets are handled, it is optimal to provide a seated sensor that detects that a lower surface of a head part of each rivet is in contact with (seated on) the upper surface of the clip 220. However, in this case, a plurality of seated sensors for detecting a plurality of seating positions of various types of rivets are required. Meanwhile, since only a single seated sensor is sufficient in a modification example illustrated in FIG. 17, it is not necessary to provide the plurality of seated sensors. Even in a case where only a single seated sensor is used, positions where various types of rivets are separated from the rivet suction unit 40 can be appropriately set only using a single seated sensor by appropriately setting the distance L from the cylinder 42 to the tip of the suction shaft 41.

Figure 18:
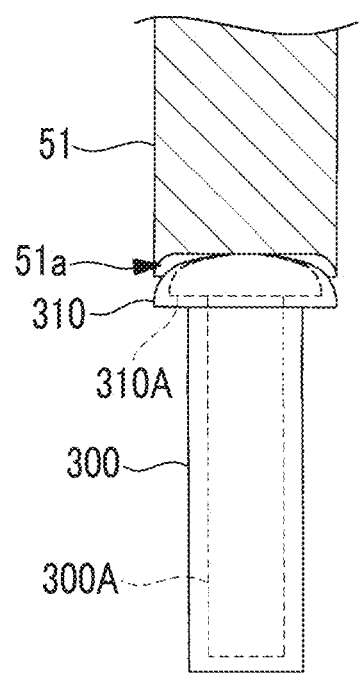
FIG. 18 is a longitudinal sectional view illustrating the shape of a lower end surface of an upper anvil of the caulking unit.

Next, the shape of the upper anvil 51 included in the caulking unit 50 of the present embodiment will be described in detail. As illustrated in FIG. 18, a recess 51a is formed in a surface on a lower end side of the upper anvil 51.

A bottom surface of the recess 51a has a planar shape. Meanwhile, the rivet 300 held by the recess 51a has a gentle convex surface shape in which an upper surface of the head part 310 is in contact with the bottom surface of the recess 51a.

The bottom surface of the recess 51a is also capable of being in contact with an upper surface of the head part 310A of the rivet 300A. Here, the head part 310A of the rivet 300A has a diameter smaller than the head part 310 of the rivet 300. In this way, the recess 51a has a shape capable of corresponding to both of the rivet 300 and the rivet 300A having the different shapes. In this way, the upper anvil 51 included in the caulking unit 50 of the present embodiment has a shape capable of executing the caulking operation of the various types of rivets.

The drilling unit 20 of the automatic riveting machine 100 of the present embodiment may further include a measuring instrument 23 that measures the amount of displacement (a maximum value of a push-back amount) caused by the reaction force received from the stringer 210 and the clip 220 and directed to above the axis X when the drilling unit 20 performs drilling.

Figure 19:
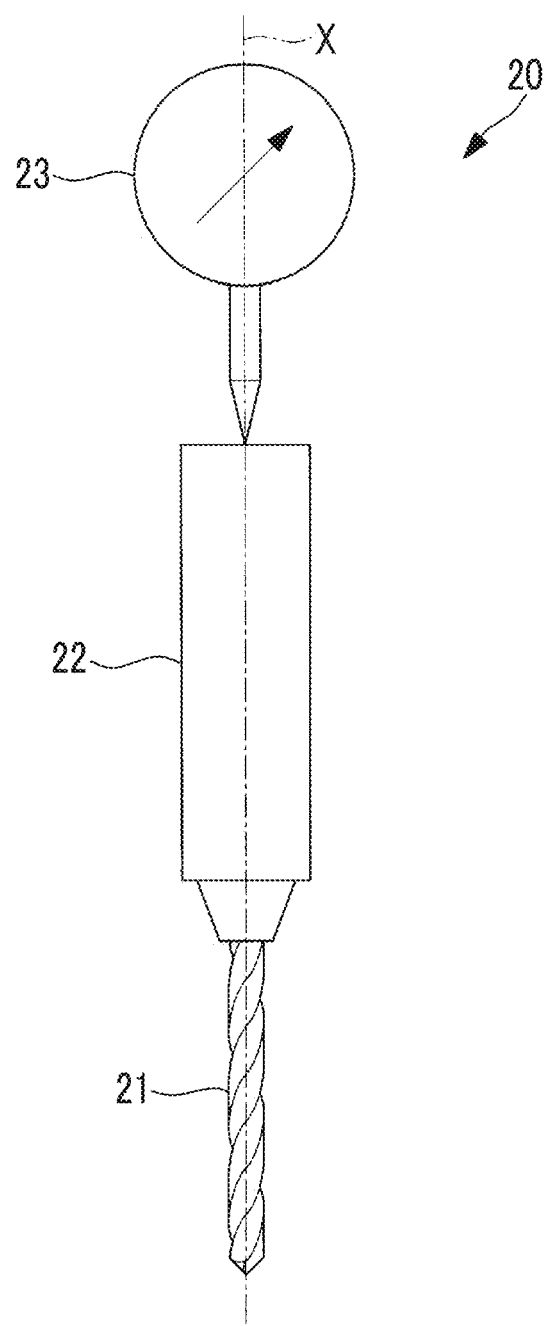
FIG. 19 is a front view illustrating a measuring instrument that measures a reaction force that the drilling unit receives when drilling is performed.

The measuring instrument 23 illustrated in FIG. 19 measures the amount of displacement caused by the reaction force (the maximum value of the push-back amount) applied to the drilling unit 20 during the drilling operation by the drilling unit 20, and transmits the amount of displacement to the control unit 60. In a case where the amount of displacement (maximum value of the push-back amount) is large, there is a possibility that the quality of the through holes 230 formed by the drilling operation becomes low. This is because the possibility that an error occur in the shape or the like of the through holes 230 due to the large reaction force is high.

In the automatic riveting machine 100 of the present embodiment, the control unit 60 stores the amount of displacement (push-back amount) measured by the measuring instrument 23 measures and the through holes 230 for which the amount of displacement is obtained, in association with each other. In this way, in a case where inspection or the like of a fastening state in the riveting position P is performed, a point having a possibility that the quality of the through holes 230 is low can be specified.

The functions and the effects exhibited by the present embodiment described above will be described.

According to the automatic riveting machine 100 of the present embodiment, the clip 220 out of the stringer 210 and the clip 220 of which the relative positions are fixed is supported at the riveting position P by the upper support body 11, and the stringer 210 is supported at the riveting position P by the lower support body 12. The upper support body 11 is formed in a rod shape having the through hole 11Aa extending along the axis X, the rivet 300 suctioned to the rivet suction unit 40 formed in a cylindrical shape is inserted, and the upper anvil 51 is inserted.

In this way, according to the automatic riveting machine 100 of the present embodiment, since the upper support body 11 is formed in a rod shape having the through hole 11Aa extending along the axis X, the upper support body 11 can be appropriately moved to the riveting position P even if the riveting position P is a narrow space.

According to the automatic riveting machine 100 of the present embodiment, in order to bring the upper anvil 51 and the lower anvil 52 close to each other after the rivet 300 is inserted into the through holes 230 and the rivet suction unit 40 is retreated from the upper support body 11, the insertion of the rivet 300 and the caulking of the rivet 300 can be performed as respectively independent operations. For that reason, the rivet suction unit 40 can be formed in a shape suitable for the suction of the rivet 300, and the upper anvil 51 can be formed in a shape suitable for caulking. For example, the rivet suction unit 40 having shapes capable of suctioning various types of rivets, respectively, can be adopted, and the upper anvil 51 having shapes capable of caulking the various types of rivets, respectively, can be adopted.

Hence, compared to the case where insertion of a rivet and caulking of the rivet are performed using a single member, it is possible to perform riveting using various types of rivets, and the productivity when the riveting is performed is improved.

In the automatic riveting machine 100 of the present embodiment, the control unit 60 controls the drilling unit 20 so as to perform the drilling operation of the through holes 230 on the stringer 210 and the clip 220, and controls the rivet suction unit 40 so as to insert the shaft part 320 of the rivet 300 into the through holes 230 formed at the riveting position P after the drilling unit's 20 performs the drilling operation to retreat from the riveting position P.

In this way, since it is not necessary to form the through holes 230 in advance with another device with respect to the riveting position P of the stringer 210 and the clip 220, the productivity is improved.

The discharge holes 11a and 11b for discharging the cutting chips generated by the drilling performed by the drilling unit 20 are formed in the upper support body 11. In this way, the cutting chips generated by the drilling operation performed by the drilling unit 20 can be suctioned from the discharge holes 11a and 11b and discharged to the outside, and the through holes 230 can be excellently finished.

In the automatic riveting machine 100 of the present embodiment, a state where the members to be fastened (the stringer 210 and the clip 220) of which the relative positions are fixed by the upper support body 11 and the lower support body 12 are continuously supported without being separated from each other on the way. For that reason, since a series of operations from the drilling to the caulking of the rivet 300 can be completed in a state where the members to be fastened are continuously supported, the productivity is improved.

REFERENCE SIGNS LIST

10: SUPPORTING UNIT
11: UPPER SUPPORT BODY (FIRST SUPPORT BODY)
11A: ROD-SHAPED PART
11Aa: THROUGH HOLE
11B: DIAMETER-REDUCED PART

11a: DISCHARGE HOLE
11b: DISCHARGE HOLE
12: LOWER SUPPORT BODY (SECOND SUPPORT BODY)
20: DRILLING UNIT (DRILLING PART)
21: DRILL
22: BODY PART
23: MEASURING INSTRUMENT
30: RIVET SUPPLY UNIT
40: RIVET SUCTION UNIT (RIVET SUCTION PART)
41: SUCTION SHAFT
42: CYLINDER
50: CAULKING UNIT (CAULKING PART)
51: UPPER ANVIL (CAULKING MEMBER)
51a: RECESS
52: LOWER ANVIL (CAULKING MEMBER)
60: CONTROL UNIT
70: DETECTING DEVICE
100: AUTOMATIC RIVETING MACHINE
210: STRINGER (LONGITUDINAL PENETRATING MEMBER)
220: CLIP
230: THROUGH HOLE
300: RIVET
310: HEAD PART
320: SHAFT PART
410, 420: SUCTION PART
P: RIVETING POSITION
X, X1, X2: AXIS
θ1, θ2: ANGLE

The invention claimed is:

1. A riveting machine that rivets a rivet at a riveting position of a pair of members to be fastened relative positions of which are fixed, the riveting machine comprising:
a single control unit that controls
a supporting unit including a first support body that is formed in a rod shape having a through hole extending along an axis and supports one member of the pair of members to be fastened at the riveting position and a second support body that is formed in a rod shape having a through hole extending along the axis and supports the other member of the pair of members to be fastened at the riveting position;
a drilling part that performs drilling of the through holes in the pair of members to be fastened at the riveting position;
a rivet supply part that supplies the rivet to be inserted into the riveting position in accordance with an instruction from the single control unit;
a rivet suction part that is formed in a cylindrical shape extending along the axis, and suctions a head part of the rivet with an interior thereof being in a negative-pressure state in a state where one end is brought into contact with the head part of the rivet; and
a caulking part that caulks the pair of members to be fastened by the rivet by inserting a pair of shaft-like caulking members into the first support body and the second support body and bringing the pair of caulking members close to each other, in a state where the rivet is inserted into through holes formed in the pair of members to be fastened at the riveting position, wherein
the single control unit controls the rivet suction part so as to move the rivet suction part, to which the head part of the rivet is suctioned, to the first support body to insert a shaft part of the rivet into the through holes formed at the riveting position, and
the single control unit controls the caulking part so as to bring the pair of caulking members close to each other to caulk the pair of members to be fastened by the rivet after the rivet suction part inserts the rivet into the through holes and retreats from the riveting position.

2. The riveting matching according to claim 1, further comprising:
a drilling part that performs drilling of the though holes in the pair of members to be fastened at the riveting position,
wherein the control units controls the drilling part so as to perform the drilling of the through holes in the pair of members to be fastened that is supported at the riveting position by the first support body and the second support body, and controls the rivet suction part so as to insert the shaft part of the rivet into the though holes formed at the riveting position after the drilling part performs the drilling of the through holes and retreats from the riveting position.

3. The riveting machine according to claim 2,
wherein a discharge hole for discharging cutting chips of the pair of members to be fastened which is generated by the drilling performed by the drilling part is formed in the first support body.

4. The riveting machine according to claim 2,
wherein the drilling part includes a measuring instrument that measures an amount of displacement caused by a reaction force received from the members to be fastened when performing the drilling of the through hole, and
wherein the control unit stores the amount of displacement measured by the measuring instrument and the through holes for which the amount of displacement is obtained, in association with each other.

5. A control method for a riveting machine that rivets a rivet at a riveting position of a pair of members to be fastened relative positions of which are fixed, the riveting machine including
a single control unit that controls
a supporting unit including a first support body that is formed in a rod shape having a through hole extending along an axis and supports one member of the pair of members to be fastened at the riveting position, and a second support body that is formed in a rod shape having a through hole extending along the axis and supports the other member of the pair of members to be fastened at the riveting position;
a drilling part that performs drilling of the through holes in the pair of members to be fastened at the riveting position;
a rivet supply part that supplies the rivet to be inserted into the riveting position in accordance with an instruction from the single control unit;
a rivet suction part that is formed in a cylindrical shape extending along the axis, and suctions a head part of the rivet with an interior thereof being in a negative-pressure state in a state where one end is brought into contact with the head part of the rivet, and
a caulking part that caulks the pair of members to be fastened by the rivet by inserting a pair of caulking members into the first support body and the second support body and bringing the pair of caulking members close to each other, in a state where the rivet is inserted into through holes formed in the pair of members to be fastened at the riveting position, the method comprising:
- a first control step of controlling the rivet suction part so as to move the rivet suction part, to which the head part of the rivet is suctioned, to the first support body to insert a shaft part of the rivet into the through holes formed at the riveting position; and
- a second control step of controlling the caulking part so as to bring the pair of caulking members close to each other to caulk the pair of members to be fastened by the rivet after the rivet suction part inserts the rivet into the through holes and retreats from the riveting position.

* * * * *